United States Patent [19]
Kamono et al.

[11] Patent Number: 5,428,537
[45] Date of Patent: Jun. 27, 1995

[54] CONTROL METHOD FOR ELECTRIC POWER STEERING APPARATUS FOR VEHICLE

[75] Inventors: Shinobu Kamono; Masaki Watanabe, both of Saitama; Ryuji Iizawa, Kanagawa, all of Japan

[73] Assignees: Jidosha Kiki Co., Ltd., Tokyo; Fujitsu Limited, Kanagawa, both of Japan

[21] Appl. No.: 267,843

[22] Filed: Jun. 28, 1994

Related U.S. Application Data

[63] Continuation of Ser. No. 916,893, Jul. 20, 1992, abandoned.

[30] Foreign Application Priority Data

Jul. 22, 1991 [JP] Japan .................................. 3-204605

[51] Int. Cl.$^6$ .................................................. B62D 5/04
[52] U.S. Cl. .................... 364/424.05; 180/79.1; 180/142
[58] Field of Search .................. 180/79.1, 140, 141, 180/142, 143; 364/424.05

[56] References Cited

U.S. PATENT DOCUMENTS

| | | | |
|---|---|---|---|
| 202,973 | 9/1986 | Omichi | 180/79.1 |
| 229,866 | 11/1985 | Kawabata | 180/79.1 |
| 4,735,271 | 4/1988 | Shimizu | 180/79.1 |
| 4,753,309 | 6/1988 | Marumoto et al. | 180/79.1 |
| 4,754,829 | 7/1988 | Shimizu | 180/79.1 |
| 4,836,319 | 6/1989 | Haseda et al. | 180/142 |
| 4,837,692 | 6/1989 | Shimizu | 364/424.05 |
| 4,840,389 | 6/1989 | Kawabe et al. | 280/91 |
| 4,842,088 | 6/1989 | Oshita et al. | 180/79.1 |
| 4,951,207 | 8/1990 | Furukawa et al. | 364/424.05 |
| 4,957,181 | 9/1990 | Oshita et al. | 180/79.1 |
| 5,097,918 | 3/1992 | Daido et al. | 180/79.1 |
| 5,151,860 | 9/1992 | Taniguchi et al. | 364/424.05 |
| 5,189,615 | 2/1993 | Rubel et al. | 364/424.05 |

*Primary Examiner*—Kevin J. Teska
*Assistant Examiner*—Susan Wieland
*Attorney, Agent, or Firm*—Blakely, Sokoloff, Taylor & Zafman

[57] ABSTRACT

A control method for an electric power steering apparatus for a vehicle includes a control unit having a target value generator and a primary delay system setting unit. The target value generator generates a target value of a steering force or a motor output. The primary delay system setting unit sets a primary delay system, in which a damper value, which changes in accordance with a vehicle speed, is set negative in a low-speed range where the vehicle speed is V0 to V1 (V0<V1) and changed in accordance with the vehicle speed. The damper value is calculated with a steering angular speed of an electric power steering unit. The calculated value is fed back to a difference between the target value and an actual value. The electric power steering unit is controlled using a value obtained by filtering the difference through the primary delay system.

1 Claim, 4 Drawing Sheets

CONTROL METHOD FOR ELECTRIC POWER STEERING APPARATUS FOR VEHICLE

This is a continuation of application Ser. No. 07/916,893 filed on Jul. 20, 1992, now abandoned.

BACKGROUND OF THE INVENTION

The present invention relates to a control method for an electric power steering apparatus for a vehicle.

In general, the convergence of a vehicle obtained by a steering operation in a straight direction or a running direction is degraded along with an increase in vehicle speed. One cause is that a self-aligning torque (force of returning a steering wheel) is increased as a vehicle speed is increased, and a steering wheel is strongly returned after a steering operation, thereby causing an overshoot phenomenon (in which a steering angle once returning to the center goes beyond the center toward the opposite side). If a driver releases his or her hands from the steering wheel, the overshoot phenomenon repetitively occurs, and the vehicle travels in a zigzag manner.

In an electric power steering apparatus, since the inertia of an electric power steering unit constituted by a motor and reduction gears is large, this tendency of overshoot conspicuously appears.

If a uniform damper is provided in order to prevent this phenomenon, a steering wheel cannot be lightly turned in a low-speed condition, and a sufficient convergence cannot be obtained in a high-speed condition.

The present applicants, therefore, have previously proposed Japanese Patent Laid-Open No. 1-178081 (corresponding to U.S. Ser. No. 07/290,697: and its continuing application Ser. No. 07/798,026) in order to obtain an electric power steering apparatus having good convergence in both high and low-speed conditions. That is, in a control method for this electric power steering apparatus for a vehicle (to be referred to as a prior application hereinafter), a damper (viscous element) for braking a motor is arranged for control, so that damping (viscosity) is changed along with an increase in vehicle speed.

FIG. 5 shows blocks for explaining the principle of the prior application. Referring to FIG. 5, reference numeral 1 denotes a steering wheel; 2, a torque sensor for detecting a torque based on an operation of the steering wheel 1; 3, a control unit for controlling an electric power steering unit 4 on the basis of an output from the torque sensor 2; 3a, a target value generator for generating a target value Tt of a steering force or a motor output; and 3b, a primary delay system setting means for setting a primary delay system having a variable damper value F1 corresponding to a vehicle speed. The electric power steering unit 4 includes a pinion 4b engaged with a rack 4a which is coupled to wheels, a motor 4c, and reduction gears 4d arranged between the motor 4c and the pinion 4b, as is known to those skilled in the art.

In this arrangement, the electric power steering unit 4 is controlled using a value Z0 obtained by filtering a difference between the target value Tt and an actual value Td through the primary delay system.

In the prior application, the output value Z0 from the primary delay system is multiplied by the damper value F1, and this product Z0·F1 is fed back to a difference P0 between the target value Tt and the actual value Td. In addition, as shown in FIG. 6, in a low-speed range from vehicle speed V0 to V1 (V0 < V1), the damper value F1 is set positive and decreased as the vehicle speed is increased.

As a result, in this prior application, a response time is improved in a low-speed condition (V0 to V1) in which steering wheel return control is required.

The output value Z0 from the primary delay system, however, is merely a target value of control and therefore does not always correspond to an actual value. For this reason, when the product of Z0 and the damper value F1 is fed back to the difference P0 between the target value Tt and the actual value Td, viscosity control for the electric power steering unit 4 sometimes becomes incorrect. Furthermore, an input amount to the primary delay system is (Tt−Td)−Z0·F1, i.e., Z0−F1 is subtracted as a positive value. The result is an unsatisfactory response time of steering wheel return control in a low-speed condition.

SUMMARY OF THE INVENTION

It is, therefore, a principal object of the present invention to provide a control method for an electric power steering apparatus for a vehicle, which can improve a response time of steering wheel return control in a low-speed condition (V0 to V1) and can perform viscosity control more accurately.

In order to achieve the above objective, according to one aspect of the present invention, there is provided a control method for an electric power steering apparatus for a vehicle, which detects a torque based on a steering operation performed by a driver by a torque sensor and controls an electric power steering unit via a control unit in accordance with an output from the torque sensor, wherein the control unit comprises target value generating means for generating a target value of a steering force or a motor output, and primary delay system setting means for setting a primary delay system, in which a damper value, which changes in accordance with a vehicle speed, is set negative in a low-speed range where the vehicle speed is V0 to V1 (V0 < V1) and changed in accordance with the vehicle speed, and the damper value is calculated with a steering angular speed of the electric power steering unit, the calculated value is fed back to a difference between the target value and an actual value, and the electric power steering unit is controlled using a value obtained by filtering the difference through the primary delay system.

DESCRIPTION OF THE PREFERRED EMBODIMENT

A control method for an electric power steering apparatus for a vehicle according to the present invention will be described in detail below.

Figure 1:
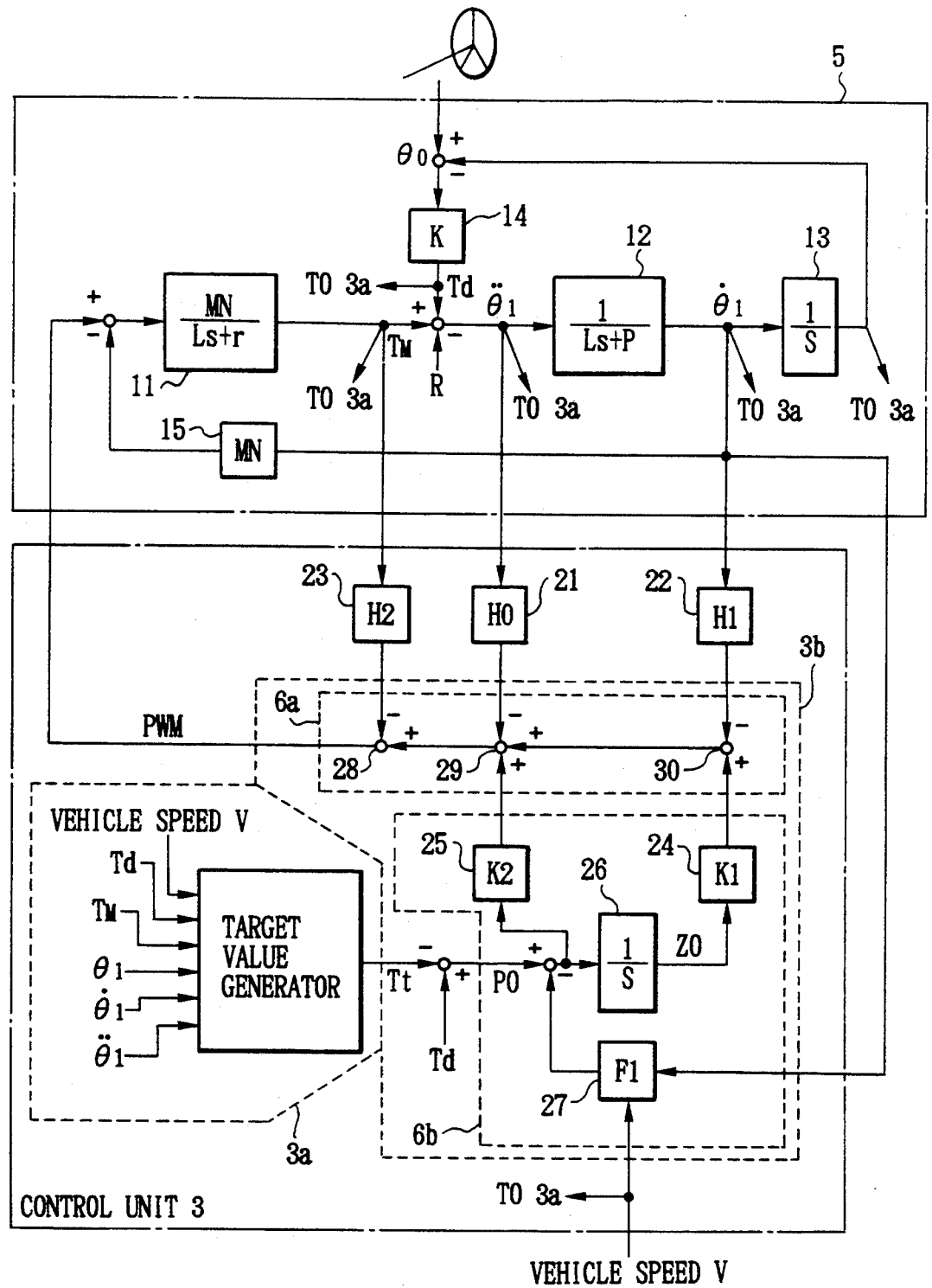
FIG. 1 is a block diagram showing a control system to which an embodiment of a control method for an electric power steering apparatus for a vehicle according to the present invention is applied.
Figure 2:
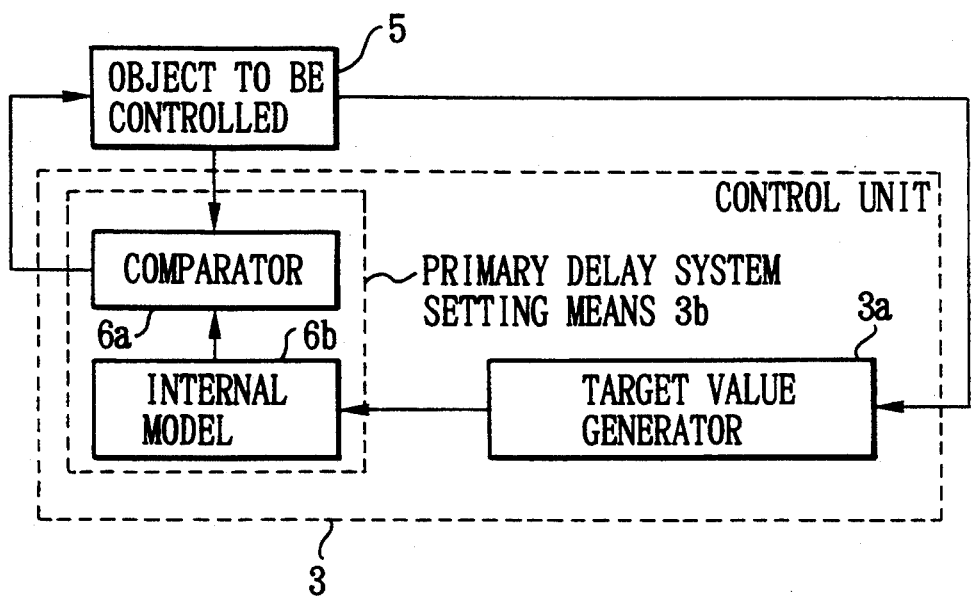
FIG. 2 is a block diagram schematically showing a control system corresponding to the block diagram shown in FIG. 1.

FIGS. 1 and 2 show blocks of a control system to which an embodiment of this control system is applied.

Referring to FIGS. 1 and 2, reference numeral 5 denotes an object to be controlled (electric power steering unit); and 3, a control unit constituted by a comparator 6a, an internal model 6b, and a target value generator 3a.

In FIG. 1, reference numeral 11 denotes a transfer function indicating a function of converting a voltage into a current in a motor (this function consists of a reactance L, a resistance r, and a motor constant M of a motor 4c, and a reduction gear ratio N of reduction gears 4d); 15, a transfer function indicating a function of changing a voltage in accordance with a pinion angular speed $\dot{\Theta}_1$; 12, a transfer function representing a primary delay steering system (L is an inertial moment and P is a viscosity coefficient); 13, a transfer function representing conversion of the pinion angular speed $\dot{\Theta}_1$ into a pinion angle $\Theta_1$; and 14, a transfer function representing conversion of a difference between a steering angle $\Theta_0$ obtained by a driver and a pinion angle $\Theta_1$ into a steering torque Td. Note that reference symbol R denotes a reactive force which is a force against a steering force and a motor output (rotational force) and corresponds to a force returning from a road surface to a pinion shaft; and S, a transformation quantity in Laplace transformation.

In FIG. 1, reference numeral 3a denotes, as mentioned before, the target value generator for generating a target value Tt; 21, 22, and 23, transfer functions representing proportionality constants of a pinion angular acceleration $\ddot{\Theta}_1$, the pinion angular speed $\dot{\Theta}_1$, and a motor Torque value $T_M$; 24 and 25, transfer functions representing proportionality constants of an output value Z0 from an ideal primary delay system and a difference P0 between the target value Tt and an actual value Td; 26, a transfer function having an integral function; 27, a transfer function serving as a damper having a damper value F1; and 28, 29, and 30, calculation units for generating a pulse-width modulated signal PWM for controlling a motor voltage. The transfer functions 26 and 27 constitute the ideal primary delay system. In this embodiment, the pinion angular speed $\dot{\Theta}_1$ is input to the transfer function 27, and the product of $\dot{\Theta}_1$ and F1 is fed back to the difference P0 between the target value Tt and the actual value Td. The result is multiplied by a proportionality gain K2 of the transfer function 25, and the product is compared with a value obtained by multiplying the steering angular acceleration signal $\ddot{\Theta}_1$ by a gain H0, thereby determining a duty ratio of PWM.

In FIG. 1, the object 5 to be controlled is represented by the transfer functions 11 to 15, and a section excluding the transfer functions 21 to 23 and the calculation units 28 to 30 denotes an ideal control system, i.e., a control system always having good convergence. This control system controls the actual object 5 to be controlled such that the function of the object 5 approaches the function of the ideal control system. The damper value F1 of the transfer function 27 changes in accordance with a vehicle speed. Therefore, by performing control such that the damper value F1 is increased with an increase in the vehicle speed, a control system having good convergence in any vehicle speed can be obtained.

Figure 3:
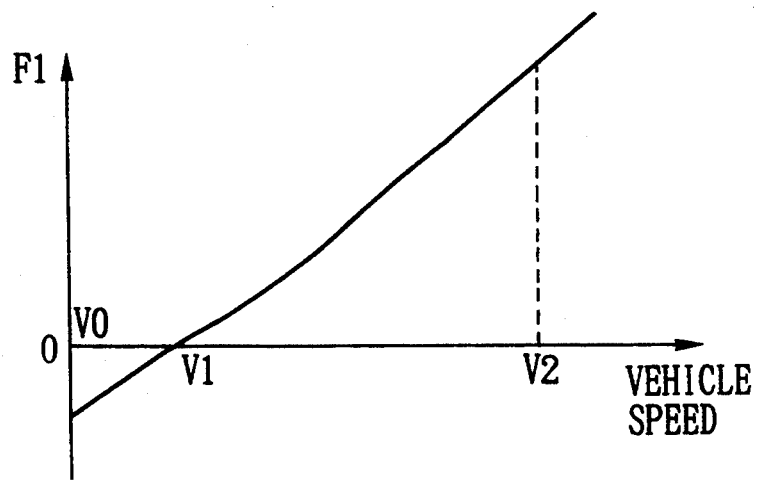
FIG. 3 is a graph showing a change in damper value F1 as a function of a vehicle speed in the method of the present invention.

FIG. 3 shows a change in the damper value F1 as a function of the vehicle speed. In this embodiment, the damper value F1 is set negative in a low-speed range (e.g., 20 to 30 KM/H) from vehicle speed V0 to V1. The damper value F1 is increased in the positive direction along with an increase in the vehicle speed. Note that in a vehicle speed range exceeding V1, as in the prior application described above, the damper value F1 is set positive and increased in the positive direction as the vehicle speed is increased. In a practical system, such damper values are input to a memory beforehand and output as the damper value F1 having a value corresponding to a vehicle speed.

According to this embodiment, therefore, an input amount to the primary delay system is $(Tt-Td)-\dot{\Theta}_1 \cdot F1$, i.e., $\dot{\Theta}_1 \cdot F1$ is subtracted as a negative value. More specifically, $\dot{\Theta}_1 \cdot F1$ is added as a positive value to $(Td-Tt)$. As a result, a response time of steering wheel return control in a low-speed condition (V0 to V1) of, e.g., 20 to 30 KM/H is improved as compared with that in the prior application.

In addition, according to this embodiment, the pinion angular speed $\dot{\Theta}_1$ is obtained directly from the object 5 to be controlled. This pinion angular speed $\dot{\Theta}_1$ is multiplied by the damper value F1, and the product is fed back to the difference P0 between the target value Tt and the actual value Td. Therefore, viscosity control for the electric power steering unit 4 can be performed more accurately than in the system of the prior application in which Z0 is multiplied by F1 and the product is fed back to P0.

Figure 4:
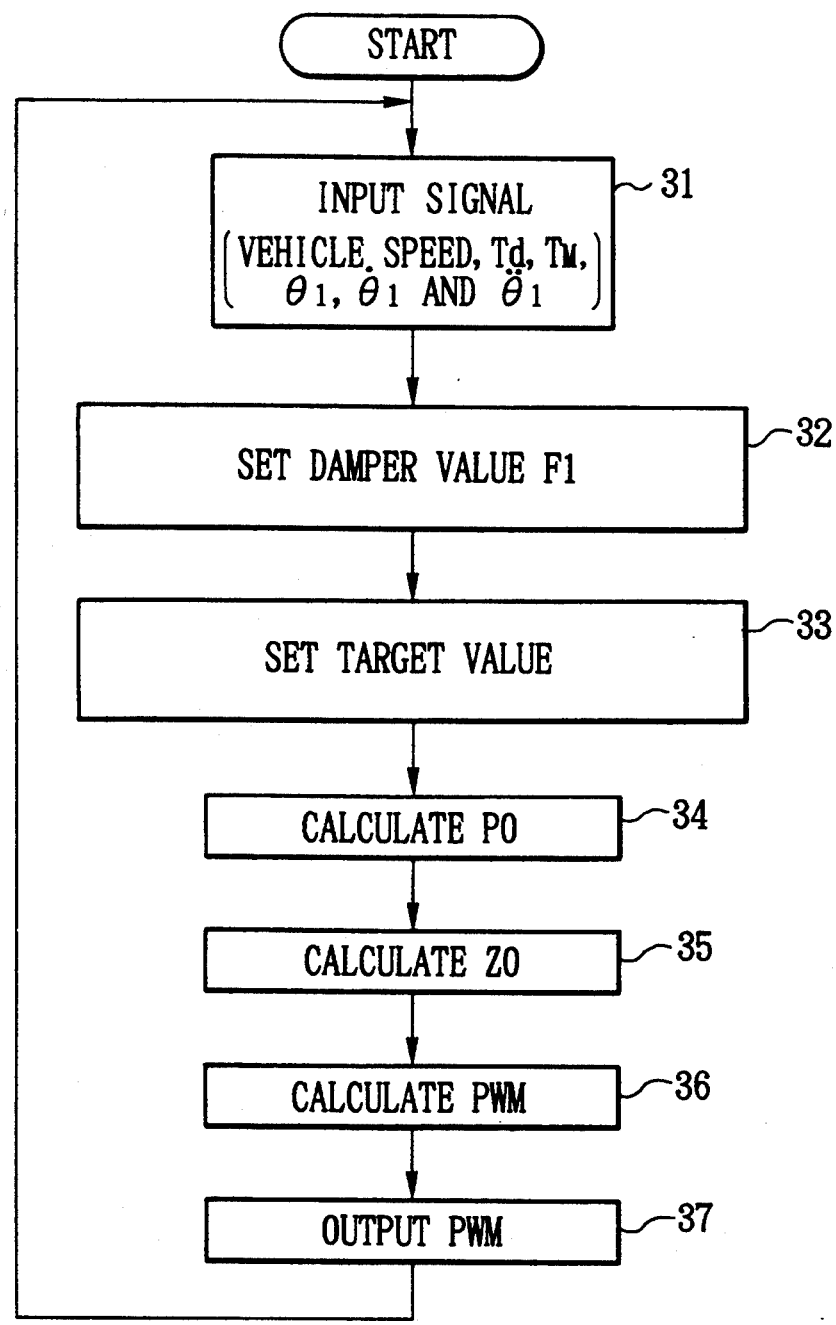
FIG. 4 is a flow chart for explaining the embodiment of the method of the present invention.
Figure 5:
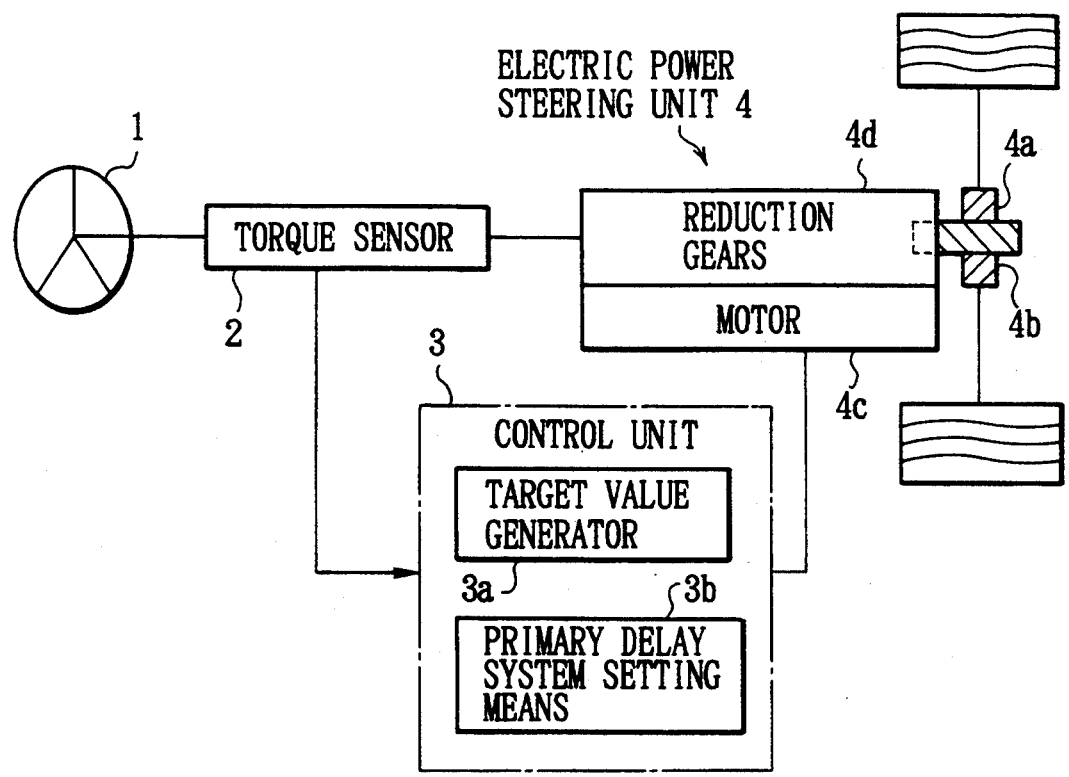
FIG. 5 is a block diagram showing the principle of a prior application.
Figure 6:
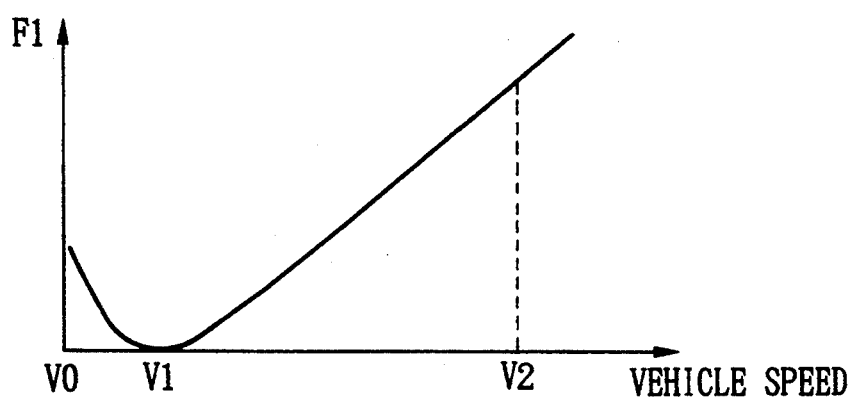
FIG. 6 is a graph showing a change in damper value F1 as a function of a vehicle speed in the prior application.

FIG. 4 shows a flow for explaining the embodiment of the control method of the electric power steering apparatus for a vehicle according to the present invention. First, a vehicle speed signal and Td, TM, $\Theta_1$, $\dot{\Theta}_1$, and $\ddot{\Theta}_1$ are input (step 31), the damper value F1 is set (step 32), and the target value Tt is set (step 33). P0 is calculated from the difference between the target value Tt and the actual value Td (step 34), and the variable Z0 is output by the transfer functions 26 and 27 (step 35). The pulse-width modulated signal PWM is calculated on the basis of these values and output to the transfer function 11 of the motor (steps 36 and 37).

According to the present invention as has been described above, in a low-speed range from V0 to V1, the negative damper value is multiplied by the steering angular speed, and the product is fed back to the difference between the target value and the actual value, which is to be filtered through the primary delay system. As a result, a response time of steering wheel return control in the low-speed condition (V0 to V1) is improved, and viscosity control is performed more accurately.

What is claimed is:

1. A control method for an electric power steering apparatus for a vehicle, which detects a torque by a torque sensor based on a steering operation performed by a driver and controls an electric power steering unit via a control unit in accordance with an output from said torque sensor, wherein said control unit comprises:
 target value generating means for generating a target value of a steering force or a motor output; and
 primary delay system setting means for setting a primary delay system, in which a damper value, which changes in accordance with a vehicle speed, is set negative in a low-speed range where the vehicle speed is V0 to V1 (V0<V1) and changed in accordance with the vehicle speed, and an input amount X according to the following formula being fed into said primary delay system:

$$X = (Td - Tt) - \dot{\Theta}_1 * F_1$$

wherein Td is an actual value, Tt is the target value, $\dot{\Theta}_1$ is a steering angular speed of said electric power steering unit, $F_1$ is the damper value, $\dot{\Theta}_1 * F_1$ is a negative value, and said electric power steering unit is controlled using an output value obtained by filtering X through said primary delay system.

* * * * *

UNITED STATES PATENT AND TRADEMARK OFFICE
CERTIFICATE OF CORRECTION

PATENT NO. : 5,428,537
DATED : June 27, 1995
INVENTOR(S) : Kamono et al

It is certified that error appears in the above-indentified patent and that said Letters Patent is hereby corrected as shown below:

In column 1 at line 66 delete "Z0.F1" and insert --Z0•F1--;

In column 2 at line 16 delete "Z0-F1" and insert --Z0•F1--;

In Claim 1, in column 4 at line 38 delete "Td, TM," and insert --Td, Tm, --.
at line 58 delete "A control method" and insert --A control apparatus--;
at line 59 delete "apparatus for a vehicle" and insert --unit for a vehicle--;

Signed and Sealed this

Twenty-fourth Day of October, 1995

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,428,537
DATED : June 27, 1995
INVENTOR(S) : Kamono et al

It is certified that error appears in the above-indentified patent and that said Letters Patent is hereby corrected as shown below:

In column 1 at line 66 delete "Z0.F1" and insert --Z0•F1--;

In column 2 at line 16 delete "Z0-F1" and insert --Z0•F1--;

In Claim 1, in column 4 at line 38 delete "Td, TM,"
and insert --Td, Tm,--.
at line 58 delete "A control method" and insert --A control apparatus--;
at line 59 delete "apparatus for a vehicle" and insert --unit for a vehicle--;

Signed and Sealed this

Second Day of January, 1996

Attest:

BRUCE LEHMAN

Attesting Officer

Commissioner of Patents and Trademarks